(12) United States Patent
Sugitani

(10) Patent No.: US 10,182,347 B2
(45) Date of Patent: Jan. 15, 2019

(54) WIRELESS COMMUNICATIONS DEVICE AND CONTROL METHOD FOR WIRELESS COMMUNICATIONS DEVICE

(71) Applicant: Panasonic Intellectual Property Management Co., Ltd., Osaka (JP)

(72) Inventor: Toshiyuki Sugitani, Saga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 14 days.

(21) Appl. No.: 15/128,083

(22) PCT Filed: Mar. 30, 2015

(86) PCT No.: PCT/JP2015/001821
§ 371 (c)(1),
(2) Date: Sep. 21, 2016

(87) PCT Pub. No.: WO2015/151495
PCT Pub. Date: Oct. 8, 2015

(65) Prior Publication Data
US 2017/0094504 A1    Mar. 30, 2017

(30) Foreign Application Priority Data

Apr. 2, 2014    (JP) .................................. 2014-075916

(51) Int. Cl.
*H04W 12/04* (2009.01)
*H04L 9/08* (2006.01)
(Continued)

(52) U.S. Cl.
CPC ........... *H04W 12/04* (2013.01); *H04L 9/0891* (2013.01); *H04L 9/16* (2013.01); *H04M 1/725* (2013.01);
(Continued)

(58) Field of Classification Search
CPC ..... H04W 12/04; H04W 12/02; H04W 84/20; H04L 9/08; H04L 9/0891; H04L 9/16; H04L 2209/80; H04M 1/725
See application file for complete search history.

(56) References Cited

U.S. PATENT DOCUMENTS

2004/0158704 A1* 8/2004 Oates .................. H04L 63/0428
713/151
2006/0089149 A1* 4/2006 Kizu .................... H04W 16/10
455/450
(Continued)

OTHER PUBLICATIONS

Extended European Search Report, dated Dec. 15, 2016, for corresponding EP Application No. 15772733.0-1870, 9 pages.
ETSI EN 300 175-2 V1.9.1, "Digital Enhanced Cordless Telecommunications (DECT); Common Interface (CI); Part 2: Physical Layer (PHL)," Sep. 2005, 64 pages.
(Continued)

*Primary Examiner* — Ayoub Alata
(74) *Attorney, Agent, or Firm* — Seed IP Law Group LLP

(57) ABSTRACT

A wireless communications device, that is constituted from a control station and a slave station that perform encryption communication using an encryption key, includes a controller that monitors communication quality of a state of a call to the slave station and, in a case where the communication quality degrades to below the same level as a state that is determined in advance, operates in such a manner that a procedure for changing the encryption key, which is determined in advance, is not activated.

2 Claims, 5 Drawing Sheets

(51) Int. Cl.
*H04L 9/16* (2006.01)
*H04M 1/725* (2006.01)
*H04W 12/02* (2009.01)
*H04W 84/20* (2009.01)

(52) U.S. Cl.
CPC ......... *H04L 2209/80* (2013.01); *H04W 12/02* (2013.01); *H04W 84/20* (2013.01)

(56) References Cited

U.S. PATENT DOCUMENTS

| | | | | |
|---|---|---|---|---|
| 2010/0146091 A1* | 6/2010 | Curtis | ................... | G06F 15/173 709/223 |
| 2013/0072106 A1* | 3/2013 | Koskela | ................ | H04W 16/14 455/3.01 |

OTHER PUBLICATIONS

ETSI EN 300 175-3 V1.9.1, "Digital Enhanced Cordless Telecommunication (DECT); Common Interface (CI); Part 3: Medium Access Control (MAC) layer," Sep. 2005, 235 pages.

ETSI EN 300 175-5 V1.9.1, "Digital Enhanced Cordless Telecommunication (DECT); Common Interface (CI); Part 5: Network (NWK) layer," Sep. 2005, 309 pages.

ETSI EN 300 175-7 V2.4.0, Digital Cordless Telecommunication (DECT); Common Interface (CI); Part 7: Security features, Dec. 2011, 142 pages.

ETSI EN 300 444 V2.2.6, "Digital Enhanced Cordless Telecommunication (DECT); Generic Access Profile (GAP)," Dec. 2011, 154 pages.

International Search Report dated May 26, 2015, for corresponding International Application No. PCT/JP2015/001821, 4 pages.

* cited by examiner

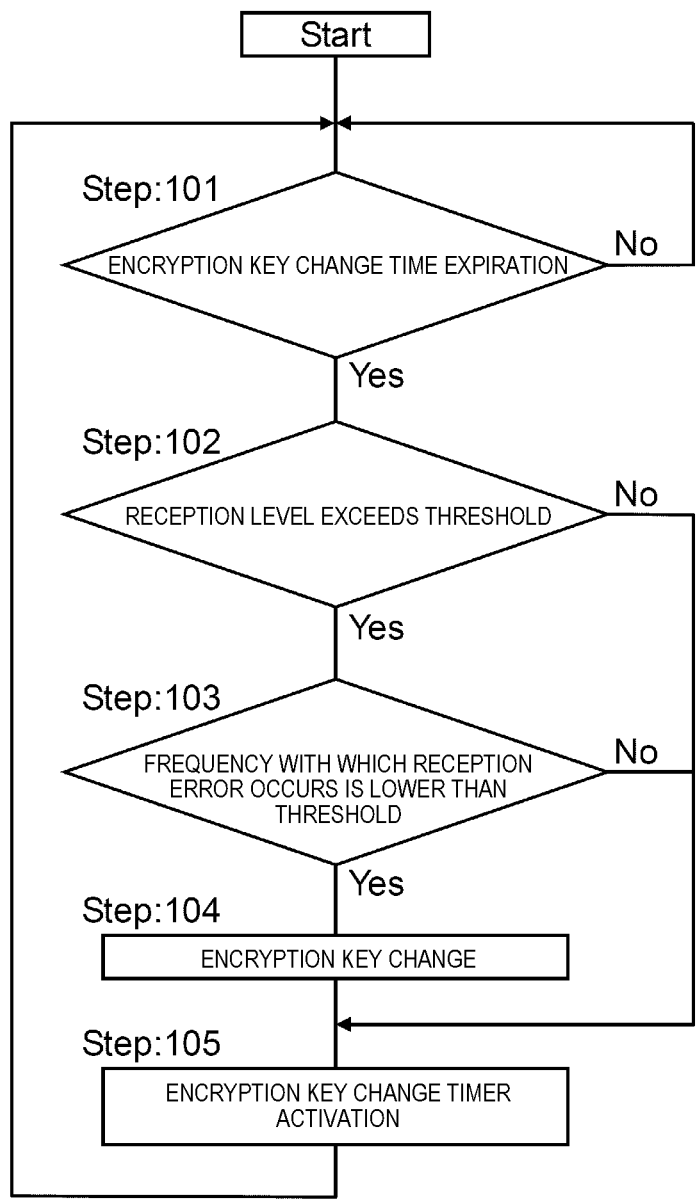

WIRELESS COMMUNICATIONS DEVICE AND CONTROL METHOD FOR WIRELESS COMMUNICATIONS DEVICE

TECHNICAL FIELD

The present invention relates to a wireless communications device that is capable of being used as a cordless telephone or the like, and a control method for the wireless communications device.

BACKGROUND ART

In order to improve security performance, a technology in which encryption is performed for transmission and reception of control data for negotiation for establishing a communication path or of audio data that is to be transmitted and received during a call and thus communication is performed is used in wireless communication that is used for a cordless telephone or the like. In the wireless communication such as in the cordless telephone, a common key encryption schemes that use the same key for encryption and decoding are widely employed. In order to improve convenience, a key that is used in the common key encryption scheme is automatically generated using wireless communication, and the generated key is stored in a non-volatile memory of each of the master and slave devices, such as an EEPROM and is used for encryption communication, in the wireless communications device, such as a cordless telephone, that is used by an ordinary person. For example, encryption specifications, which are used for wireless communication in compliance with Digital Enhanced Cordless Telecommunications (DECT) schemes that are in wide use around the world as communication schemes for a digital cordless telephone, are stipulated in NPL 1, NPL 2, NPL 3, and NPL 4, and NPL 5. In NPL 5, a procedure and the like in a case where audio communication such as in a cordless telephone is performed using a master device and a slave device that perform communication with the DECT scheme is stipulated, and an early-encryption method in which the encryption communication is activated immediately after a wireless link is established between the master device and the slave device and a Re-keying during a call method in which the encryption communication continues while changing a key for the encryption communication at suitable intervals are stipulated.

CITATION LIST

Non-Patent Literature

NPL 1: ETSI EN 300 175-2: "Digital Enhanced Cordless Telecommunications (DECT); Common Interface (CI); Part 2: Physical Layer (PHL)"
NPL 2: ETSI EN 300 175-3: "Digital Enhanced Cordless Telecommunications (DECT); Common Interface (CI); Part 3: Medium Access Control (MAC) layer"
NPL 3: ETSI EN 300 175-5: "Digital Enhanced Cordless Telecommunications (DECT); Common Interface (CI); Part 5: Network (NWK) layer"
NPL 4: ETSI EN 300 175-7: "Digital Enhanced Cordless Telecommunications (DECT); Common Interface (CI); Part 7: Security features"
NPL 5: ETSI EN 300 444: "Digital Enhanced Cordless Telecommunications (DECT); Generic Access Profile (GAP)"

SUMMARY OF THE INVENTION

Solution to Problem

According to an aspect of the present invention, there is provided a wireless communications device that is constituted from a control station and a slave station that perform encryption communication using an encryption key and that changes the encryption key in a call state in a predetermined procedure, in which the control station is constituted to include a controller that monitors communication quality of a state of a call to the slave station and, in a case where the communication quality degrades to below the same level as a state that is determined in advance, operates in such a manner that a procedure for changing the encryption key, which is determined in advance, is not activated.

BRIEF DESCRIPTION OF DRAWINGS

FIG. 6 is a flowchart illustrating an example of an operation of the master device during the call according to the first exemplary embodiment of the present invention.

DESCRIPTION OF EMBODIMENTS

Embodiments of the present invention will be described below.

First Exemplary Embodiment

[Constitution of a Cordless Telephone]

Figure 1:
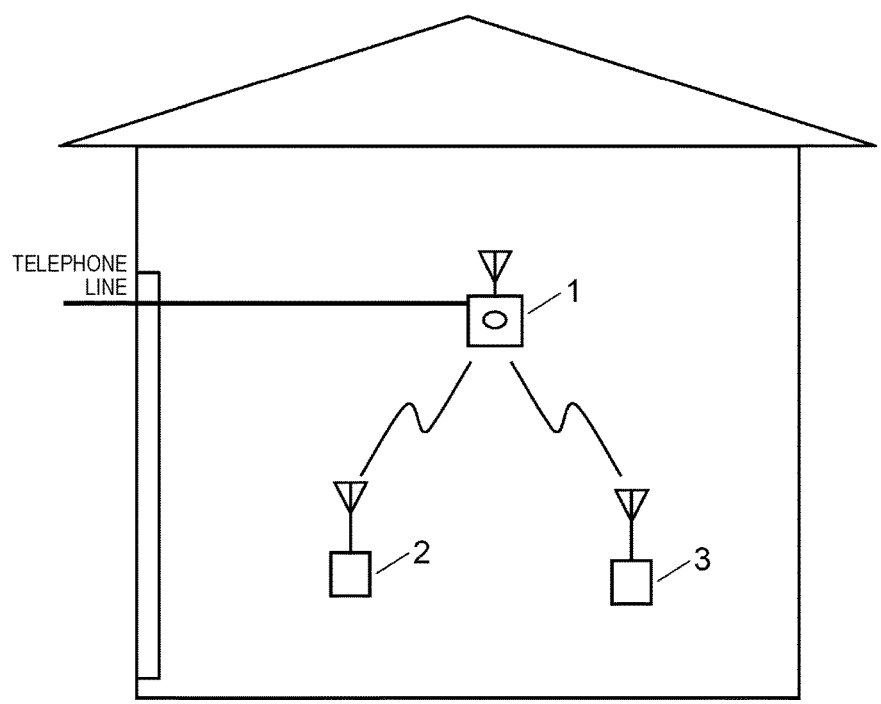
FIG. 1 is a diagram illustrating an example of a cordless telephone for which a wireless communications device according to a first exemplary embodiment of the present invention is used.

An example of a constitution of a wireless communications device according to a first exemplary embodiment is described. FIG. 1 is a diagram illustrating an example of a cordless telephone for which the wireless communications device according to the present exemplary embodiment is used.

The cordless telephone for which the wireless communications device according to the present invention is used, which is illustrated in FIG. 1 is an example of a cordless telephone that is constituted from master device 1 and slave devices 2 and 3. Master device 1 is connected to a telephone line. Master device 1 as a control station and slave devices 2 and 3 as slave stations, for example, may be able to perform wireless communication in compliance with a DECT scheme, and slave devices 2 and 3 may be able to carry out an external-line call or an internal-line call through master device 1.

[Constitution of a Master Device]

Figure 2:
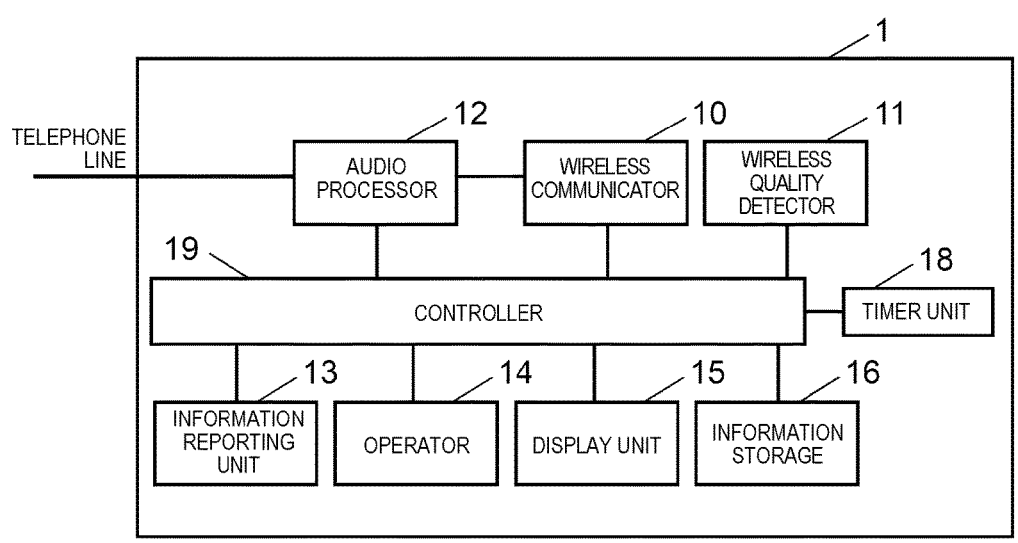
FIG. 2 is a block diagram illustrating an example of a constitution of a master device according to the first exemplary embodiment of the present invention.

An example of a constitution of a master device is described. FIG. 2 is a block diagram illustrating a configuration example of master device 1.

In FIG. 2, master device 1 has wireless communicator 10, wireless quality detector 11, audio processor 12, information reporting unit 13, operator 14, display unit 15, information storage 16, timer unit 18, and controller 19.

Wireless communicator 10 performs transmission and reception of control data or audio data for establishment of a wireless link or the external-line call, using a prescribed scheme, and in the case of encryption communication, performs encryption of transmission data and decoding of reception data. In the present specification, the "wireless communication" is assumed to include wireless transmission and wireless reception.

Wireless quality detector 11 determines whether the quality of the reception signal is good, from a level of a reception signal that is received from wireless communicator 10 and the frequency with which a reception error occurs.

Audio processor 12 converts into a digital signal an audio signal that is input from a telephone line or a microphone (not illustrated), generates audio data for transmission, converts the received audio data into an analog signal, and outputs the resulting analog signal to the telephone line or a speaker (not illustrated). When the reception error occurs, and when a sequence error is detected at the time of changing an encryption key, an amount of audio output is reduced and the frequency of occurrence of noise is decreased.

Information reporting unit 13 receives an incoming call from the external line or is called up from slave devices 2 and 3 through an internal line, and outputs information reporting sound. An example of the information reporting sound, ringer sound is given.

Operation unit 14 is a button for receiving a user operation. Examples of the user operation, an operation (an outgoing-call operation) of placing a call, an operation of receiving a call (an incoming-call operation), an operation (slave device registration operation) of performing registration of a slave device, and the like are given.

Information on the user is displayed on display unit 15. As example of the information, a telephone number, registration information, an operation menu for slave devices 2 and 3, and the like are given.

An identification code (which is hereinafter referred to as an ID of the master device) of master device 1 and information on the slave device that is registered with master device 1 are stored in information storage 16. Information storage 16 is constituted as a non-volatile memory such as an EEPROM. Pieces of information on the slave device that is stored in information storage 16 are an identification code (which is hereinafter referred to as an ID of the slave device) and an authentication key for identifying and authenticating the registered slave device, and an encryption key that is used for the encryption communication.

Timer unit 18 measures an interval at which the encryption key changes, and a time, such as an interval for retrying changing the encryption key.

Controller 19 controls operation of entire master device 1 in cooperation with each unit described above. Control by controller 19 will be described below. Master device 1, for example, has a Central Processing Unit (CPU), a storage medium, such as a Read Only Memory (ROM) in which a control program is stored, and a memory for operation, such as a Random Access Memory (RAM). In this case, a function of controller 19 is realized by the CPU executing the control program.

Functional units that are included in master device 1 are not limited to the functional units whose reference numbers are 10 to 19, which are illustrated in FIG. 2 and other functional units may be included. Other functional units may be functional units that realize main functions of master device 1, and may be functional units that realize auxiliary functions that assist the main functions.

[Constitution of the Slave Device]

Figure 3:
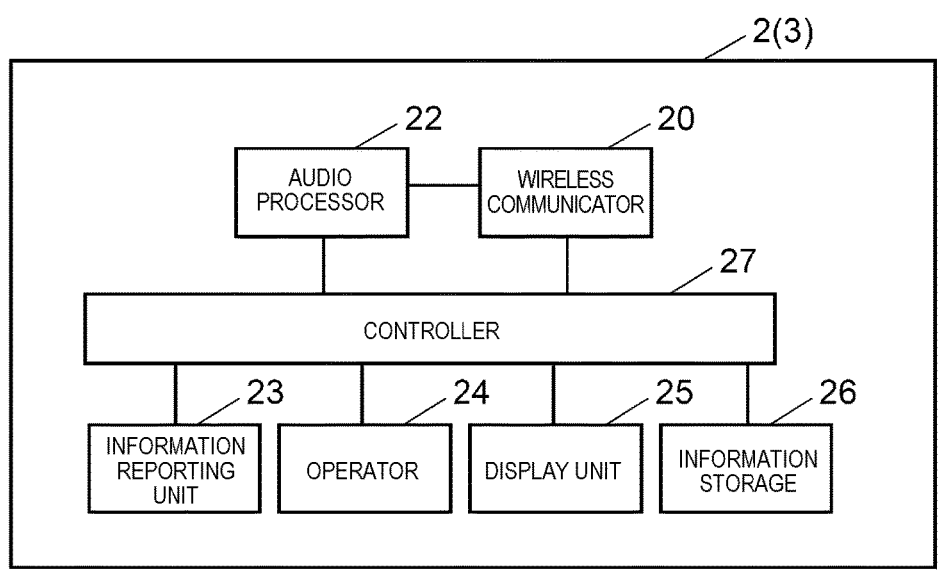
FIG. 3 is a block diagram illustrating an example of a constitution of a slave device according to the first exemplary embodiment of the present invention.

An example of a constitution of the slave device is described. FIG. 3 is a block diagram illustrating an example of the constitution of slave device 2. Because a constitution of slave device 3 is the same as that of slave device 2, a description relating to slave device 3 is omitted.

In FIG. 3, slave device 2 has wireless communicator 20, audio processor 22, information reporting unit 23, operator 24, display unit 25, information storage 26, and controller 27.

Wireless communicator 20 performs transmission and reception of control data or audio data for establishment of a wireless link or the external-line call, using a prescribed scheme, and in the case of encryption communication, performs encryption of transmission data and decoding of reception data.

Audio processing unit 22 converts into a digital signal an audio signal that is input from a microphone (not illustrated), generates audio data for transmission, converts the received audio data into an analog signal, and outputs the resulting analog signal to a speaker (not illustrated). When a reception error occurs, and when a sequence error is detected at the time of changing an encryption key, an amount of reception audio output is reduced and the frequency of occurrence of noise is decreased.

Information reporting unit 23 receives an incoming call from the external line or is called up from master device 1 and slave device 3 through the internal line, and outputs information reporting sound. As example of the information reporting sound, ringer sound is given.

Operation unit 24 is a button for receiving a user operation. As examples of the user operation, an operation (an outgoing-call operation) of placing a call, an operation of receiving a call (an incoming-call operation), an operation (slave device registration operation) of performing registration of a slave device, and the like are given.

Information on the user is displayed on display unit 25. As example of the information, a telephone number, an operation menu for slave device 2, and the like are given.

Included in information storage 26 are a slave ID of slave device 2, a master ID and an authentication key of the registered master device, that is, master device 1, and an encryption key that is used for the encryption communication. Information storage 26 is constituted as a non-volatile memory such as an EEPROM.

Controller 27 controls operation of entire slave device 2 in cooperation with each unit described above. Control by controller 27 will be described below. Slave device 2, for example, has a CPU, a storage medium, such as a ROM in which the control program is stored, and a memory for operation, such as a RAM. In this case, a function of controller 27 is realized by the CPU executing the control program.

Functional units that are included in slave device 2 is not limited to the functional units whose reference numbers are 20 to 27 and which are illustrated in FIG. 3 and other functional units may be included. Other functional units may be functional units that realize main functions of slave device 2, and may be functional units that realize auxiliary functions that assist the main functions.

[Operation of Each of Master Device 1 and Slave Device 2]

An example of operation of the cordless telephone that uses the wireless communications device according to the present invention, which is described above, will be described below.

Figure 4:
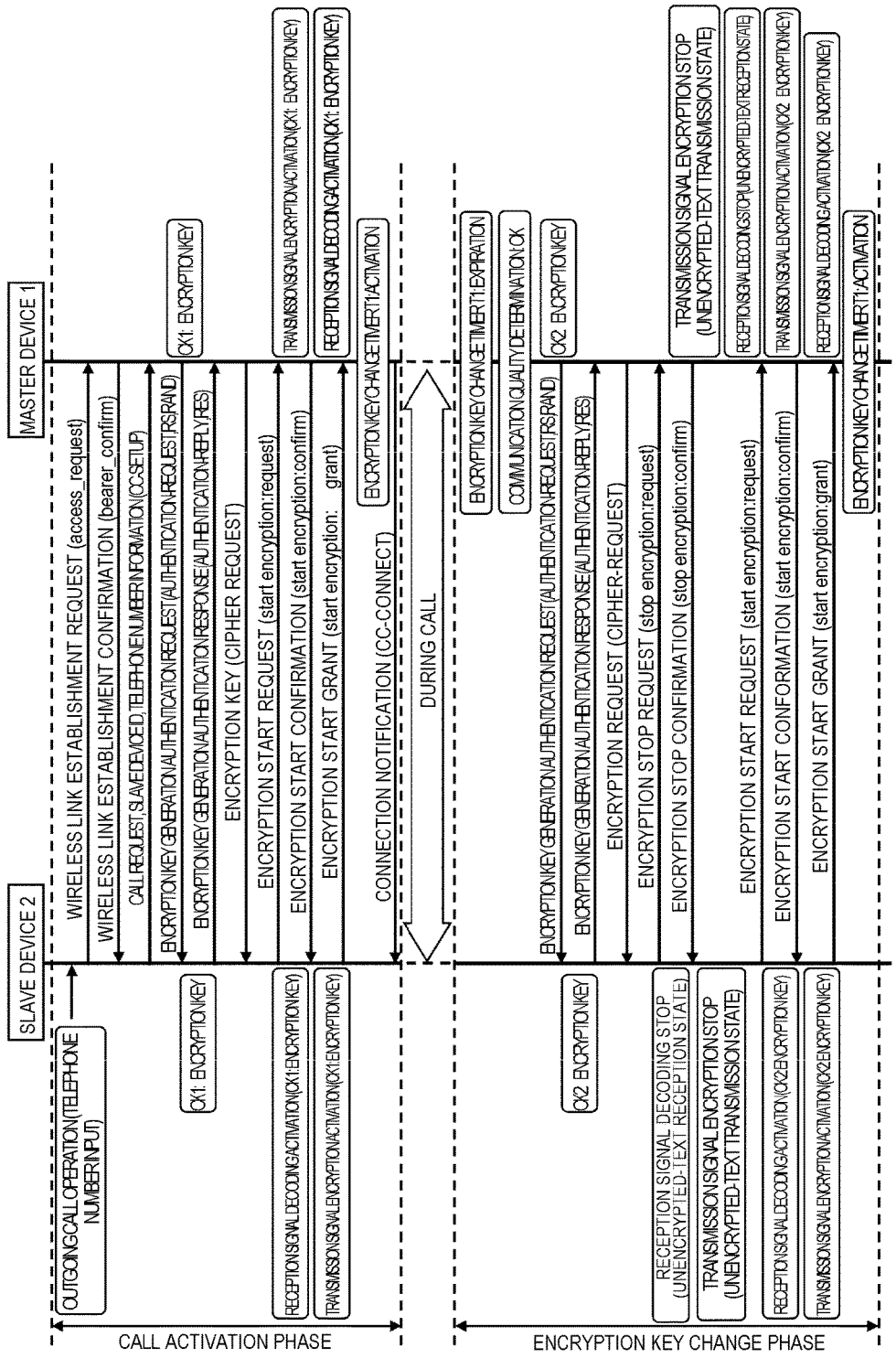
FIG. 4 is a diagram illustrating an example of a signal that is transmitted and received in wireless communication and an operation between the master device and the slave device from when placing a call to when the call is in progress, according to the first exemplary embodiment of the present invention.

FIG. 4 is a diagram illustrating an example of a signal that is transmitted and received in wireless communication and an operation between the master device and the slave device from when placing a call to when the call is in progress. In FIG. 4, a call activation phase is a phase for establishing a wireless link between master device 1 and slave device 2, notifying telephone number information and the like of a connection destination, and establishing a path for communication with the other party that is a call destination. When the call activation phase is completed, a telephone line that is connected to audio processor 12 of master device 1 and a microphone and a speaker (which are not illustrated) that are connected to audio processor 22 of slave device 2 are connected to each other through the wireless communication, and are in a state where the communication is in progress. The other communication party sends a reply, a state in which it is possible to place a call is attained. The encryption key change phase is a phase in which an encryption key is reissued during the communication and the existing encryption key is made not to be available.

First, the call activation phase will be described in detail below. When an operation in which a telephone number of the other party is designated and an outgoing call is requested is performed in operator 24 in slave device 2, controller 27 starts an operation for an outgoing call and the call activation phase is started. In the call activation phase, a wireless link establishment request (for example, access_request that is a control message of a MAC layer, in the case of the wireless communication in compliance with the DECT scheme) is transmitted by slave device 2, master device 1 replies with a wireless link establishment confirmation (for example, bearer_confirm that is a control message of the MAC layer, in the case of the wireless communication in compliance with the DECT scheme), and thus the wireless link between the master device and the slave device is established.

Subsequently, slave device 2 transmits a call request (for example, CC-SETUP that is a control message of an NWK layer, in the case of the wireless communication in compliance with the DECT scheme) that includes the slave device ID for identifying slave device 2, the telephone number information of the other communication party, and the like.

Master device 1 that receives the call request transmits a message (for example, {AUTHENTICATION-REQUEST} that is a message of the NWK layer, in the case of the wireless communication in compliance with the DECT scheme) for an encryption key generation authentication request, and slave device 2 transmits an encryption key generation authentication reply (for example, {AUTHENTICATION-REPLY}) that is a message of the NWK layer, in the case of the wireless communication in compliance with the DECT scheme). With the encryption key generation authentication request, random numbers (for example, RS and RAND, in the case of the wireless communication in compliance with the DECT scheme) that are generated by master device 1 are transmitted, and with the encryption key generation authentication reply, an authentication reply value (for example, RES in the case of the wireless communication in compliance with the DECT scheme) that is generated in the slave device is transmitted. With the transmission and reception of the encryption key generation authentication request and the encryption key generation authentication reply, master device 1 performs authentication of whether or not the slave device that is the other communication party is slave device 2 that is registered with master device 1 itself, and at the same time, encryption key CK1 for encryption communication is generated in both of master device 1 and slave device 2. The authentication and the generation of the encryption key is performed by carrying out an arithmetic operation (which is hereinafter expressed as an authentication encryption key generation arithmetic operation) that is determined in advance by using the random numbers that are transmitted and received with the encryption key generation authentication request, the authentication reply value that is transmitted and received with the encryption key generation authentication reply, and the authentication keys that are stored in information storage 16 of master device 1 and information storage 26 of slave device 2. That is, the random numbers that are transmitted and received with the encryption key generation authentication request and the authentication keys that have the same value, which are stored in advance in the master device and the slave device respectively, are set to be inputs, and thus the authentication encryption key generation arithmetic operation is carried out and an authentication reply value and an encryption key are calculated in each of master device and slave device. With the encryption key generation authentication reply, slave device 2 transmits only the obtained authentication reply value. If the authentication reply value that is received with the encryption key generation authentication reply and the authentication reply value that is calculated and obtained by master device 1 itself are compared with each other and the result is the two authentication reply values are the same, the communication that is illustrated in FIG. 4 is continued and activation of the encryption communication is started. In a case where the two authentication reply values are different from each other, the communication is discontinued (this is not illustrated).

When the authentication ends and the generation of encryption key CK1 is completed, the activation of the encryption communication is started. In a case where an encryption request (for example, {CIPHER-REQUEST} that is a message of the NWK layer, in the case of the wireless communication in compliance with the DECT scheme) from master device 1, an encryption start request (for example, start encryption: request that is a control message of the MAC layer, in the case of the wireless communication in compliance with the DECT scheme) from slave device 2, an encryption start confirmation (for example, start encryption: confirm that is a control message of the MAC layer, in the case of the wireless communication in compliance with the DECT scheme) from the master device, an encryption start grant (for example, start encryption: grant that is a control message of the MAC layer, in the case of the wireless communication in compliance with the DECT scheme) from slave device 2 are sequentially transmitted and received, and the activation of the encryption communication is completed. On the slave device 2 side, the encryption start request is transmitted, decoding processing of the reception signal is started in the following frame, and when the encryption start confirmation is received, encryption of a transmission signal is started. In master device 1, when the encryption start request is received, the encryption of the transmission signal is started, and the decoding processing of the reception signal is started with reception of the following frame in which the encryption start confirmation is transmitted. Master device 1 activates encryption key change timer T1 that measures a time at which timer unit 18 activates the encryption key change phase.

When the activation of the encryption communication is completed, master device 1 transmits connection notification (for example, {CC-CONNECT} that is a message of the NWK layer, in the case of the wireless communication in compliance with the DECT scheme), transmits to slave device 2 a signal that is input from a telephone line, and outputs to the telephone line a signal that is received from slave device 2. Furthermore, when receiving a connection notification, slave device 2 outputs to the speaker the signal that is received from master device 1, starts to transmit to master device 1 a signal that is input from the microphone, and proceeds to a state where the call is in progress. During the call, wireless quality detector 11 of master device 1 monitors a reception level of a signal from slave device 2, which is received in wireless communicator 10, and a state where the reception error occurs, and makes a determination of whether the reception level exceeds a threshold that is determined in advance and the frequency with which the reception error occurs falls below a threshold that is determined in advance.

Next, the encryption key change phase is described in detail. When encryption key change timer T1 of timer unit 18 of master device 1 expires, the encryption key change phase is started. When encryption key change timer T1 of timer unit 18 of master device 1 expires, based on a result of the determination by wireless quality detector 11, a determination of whether or not to change the encryption key is made. When making the determination, in a case where the latest reception level exceeds the threshold that is determined in advance and the frequency with which the reception error occurs falls below the threshold that is determined in advance, transmission and reception of a message for changing the encryption key are started.

The change of the encryption key is made by transmitting and receiving the encryption key generation authentication request and the encryption key generation authentication reply as is the case with the generation of the encryption key in the call activation phase. Master device 1 transmits to the slave device random numbers that are newly generated with the encryption key generation authentication request. The master device and slave device 2 generate new encryption key CK2 by carrying out an operation (which is hereinafter expressed as an authentication encryption key generation arithmetic operation) that is determined in advance by using these random numbers and the authentication keys that are stored in information storage 16 of master device 1 and information storage 26 of slave device 2.

When the generation of new encryption key CK2 is completed, the encryption communication temporarily stops, and control for changing the encryption key to the new encryption key and resuming the encryption communication is started.

First, the encryption request is transmitted from master device 1, in the same manner as when the encryption communication is activated in the call activation phase.

When receiving the encryption request, slave device 2 transmits an encryption stop request (for example, stop encryption: request that is a control message of the MAC layer, in the case of the wireless communication in compliance with the DECT scheme) for temporarily stopping the encryption communication, stops the decoding for the reception from the next frame, and proceeds to an unencrypted-text reception state (a state where a signal that is not encrypted is received).

When receiving the encryption stop request, master device 1 stops the decoding for the reception from the next frame, stops the encryption for the transmission, and proceeds to an unencrypted-text transmission and reception state (a state where a signal that is not encrypted is transmitted and received). Master device 1 transmits an encryption stop confirmation (for example, stop encryption: confirm that is a control message of a MAC layer, in the case of the DECT scheme).

When receiving the encryption stop confirmation, slave device 2 stops the encryption for the transmission, and proceeds to an unencrypted-text transmission and reception state (state in which a signal that is not encrypted is transmitted and received).

When the stopping of the encryption communication is completed, in the same manner as when the encryption communication is activated in the call activation phase, the encryption start request (for example, start encryption: request that is a control message of the MAC layer, in the case of the wireless communication in compliance with the DECT scheme) from slave device 2, the encryption start confirmation (for example, start encryption: confirm that is a control message of the MAC layer, in the case of the wireless communication in compliance with the DECT scheme) from the master device, the encryption start grant (for example, start encryption: grant that is a control message of the MAC layer, in the case of the wireless communication in compliance with the DECT scheme) from slave device 2 are sequentially transmitted and received, the activation of the encryption communication is completed, and the encryption communication is started using new encryption key CK2.

Master device 1 activates encryption key change timer T1 that measures the time at which timer unit 18 activates the encryption key change phase, and master device 1 and slave device 2 return to the state where the call is in progress.

Subsequently, master device 1 activates a wireless encryption key change phase whenever encryption key change timer T1 expires, makes a determination of whether or not to change the encryption key based on the result of the determination by wireless quality detector 11, and changes the encryption key based on a result of the determination.

Figure 5:
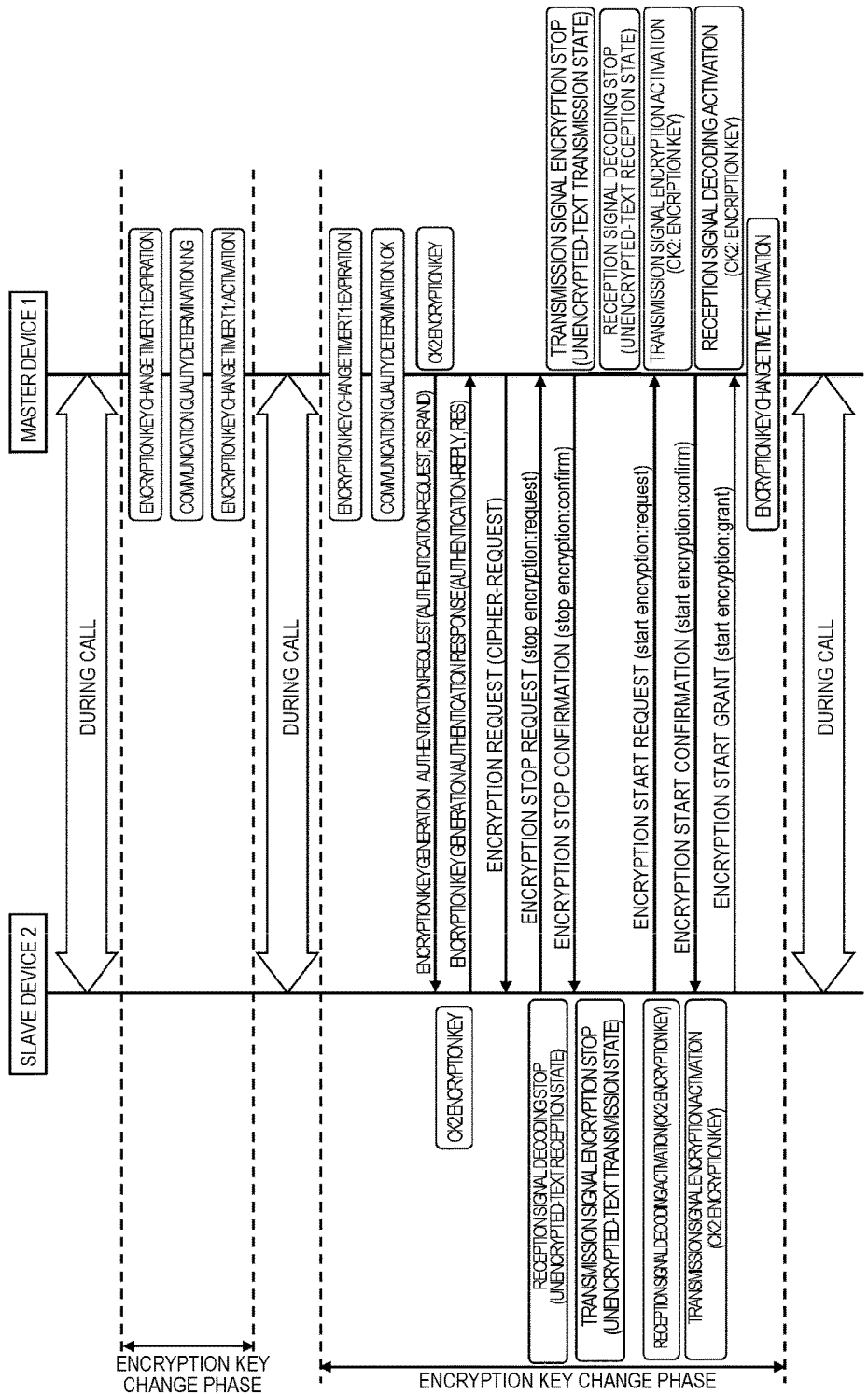
FIG. 5 is a diagram illustrating an example of a signal that is transmitted and received in the wireless communication and an operation when making a determination of communication quality during a call and changing a key for encryption communication, according to the first exemplary embodiment of the present invention.

Next, an operation in a case where the encryption key is not changed in the wireless encryption key change phase is described referring to FIG. 5. FIG. 5 is a diagram illustrating an example of a signal that is transmitted and received and an operation when making a determination of communication quality during the call and changing the key of the encryption communication, and illustrates an example of an operation in a case where the communication quality is NG in an initial encryption key change phase and the communication quality is OK in the next encryption key change phase.

As illustrated in FIG. 5, when encryption key change timer T1 of timer unit 18 of master device 1 during the call expires, the encryption key change phase is started. When encryption key change timer T1 of timer unit 18 of master device 1 expires, based on a result of the determination by wireless quality detector 11, a determination of whether or not to change the encryption key is made. When making the determination, in a case where the latest reception level does not exceed the threshold that is determined in advance, or in a case where the frequency with which the reception error does not fall below the threshold that is determined in advance, the result of the determination of the communication quality is NG, the encryption key is not changed, encryption key change timer T1 of timer unit 18 of master device 1 is reactivated, the encryption key change phase is ended, and transition to the state where the call is in progress takes place.

When encryption key change timer T1 of timer unit 18 of master device 1 during the call expires, the encryption key change phase is started. In FIG. 5, an example is illustrated that in the second encryption key change phase, it is determined that the communication quality is OK and the encryption key is replaced. An operation in which it is determined that the communication quality in FIG. 5 is OK and the encryption key is replaced is the same as the operation in the encryption key change phase in FIG. 4, which is described above, and thus a description thereof is omitted.

Next, an operation of changing the encryption key in a wireless manner, which is performed by master device 1, is described referring to FIG. 6. FIG. 6 is a flowchart illustrating one example of the operation by the master device during the call.

When proceeding to the in-process call to slave device 2, master device 1 is in a state where the encryption key change timer is activated at the time of activating the call (this is not illustrated) and where the expiration of the encryption key change timer in Step: 101 is awaited. In a case where the encryption key change timer does not expire (No in Step: 101) the state where the expiration of the encryption key change timer in Step: 101 is awaited is maintained.

When the encryption key change timer expires (Yes in Step: 101), a determination of whether or not the reception level exceeds the threshold is made (Step: 102).

When the reception level exceeds the threshold (Yes in Step: 102), a determination of whether or not the frequency with which the reception error occurs is lower than the threshold (Step: 103).

In a case where the frequency with which the reception error is lower than the threshold (Yes in Step: 103), the encryption key is changed (Step: 104). The encryption key change timer is activated (Step: 105), and transition to the state where the expiration of the encryption key change timer in Step: 101 is awaited takes place.

In a case where the reception level does not exceed the threshold in Step: 102 (No in Step: 102), and in a case where the frequency with which the reception error occurs is higher than the threshold in Step: 103 (No in Step: 103), the encryption key change timer is activated without changing the encryption key (Step: 105) and the transition to the state where the expiration of the encryption key change timer in Step: 101 is awaited takes place.

The exemplary embodiment of the present invention is described above. As described above, in a case where the encryption key is changed, the wireless communications device according to the present invention evaluates wireless communication quality, and only in a case where the communication quality is good, the encryption key is made to be changed. Because of this, the frequency with which the reception error occurs when the message for changing the encryption key is transmitted and received can be reduced. Furthermore, the number of times that noise occurs that results from a shift from timings of the stopping or the replacing of the encryption key that takes place due to the reception error when the message for changing the encryption key is transmitted and received, or the number of times that muting processing for reducing the noise is performed can be decreased. Thus, an effect is achieved in which, while reducing degradation in call quality, the replacement of the encryption key can be realized during the call.

The number of times that with the DECT scheme, each of the messages that are transmitted and received for changing the encryption key may be able to be retransmitted, in Re-keying during a call, which replaces the encryption key during the call, is stipulated. It is stipulated that in a case where the transmission and reception of the message are not completed up to a prescribed number of times of retransmission, the communication is discontinued. That is, in a state where the wireless quality is poor, in a case where a wireless device that performs the communication with the DECT scheme activates the changing of the encryption key, when the reception errors successively occur, the communication is discontinued. As a result, the inconvenience is provided. In a case where the present invention is applied to the wireless device that performs the communication with the DECT scheme, although control by the Re-keying during a call, which replaces the encryption key during the call, is performed, an effect is achieved in which the number of times that the communication discontinuance due to the degradation in the wireless quality at the time of replacing the encryption key occurs is reduced.

According to the exemplary embodiment of the present invention, the threshold for the determination of the reception level and the threshold for the determination of the frequency with which the reception error occurs may be stored in information storage 16, and may be able to be changed with an operation from operation unit 14. In this case, in a case where the communication that focuses on confidentiality is performed, by making it possible to change the threshold, it is possible that the communication is performed without depending on a state of the wireless quality while periodically changing the encryption key. Thus, an effect that can improve the convenience is achieved.

INDUSTRIAL APPLICABILITY

The wireless communications device according to the present invention is useful as a wireless communications device such as a cordless telephone.

REFERENCE MARKS IN THE DRAWINGS

1 MASTER DEVICE
2 SLAVE DEVICE
3 SLAVE DEVICE
10, 20 WIRELESS COMMUNICATOR
11 WIRELESS QUALITY DETECTOR
12, 22 AUDIO PROCESSOR
13, 23 INFORMATION REPORTING UNIT
14, 24 OPERATOR
15, 25 DISPLAY UNIT
16, 26 INFORMATION STORAGE
18 TIMER UNIT
19, 27 CONTROLLER

The invention claimed is:
1. A wireless communications device that is constituted from a control station and a slave station, wherein the control station includes:
  a wireless communicator which, in operation, performs communication between the control station and the slave station using an encryption key; and a controller which, in operation, determines whether or not to change the encryption key based on a communication quality of a call after a prescribed time elapses during the call;
wherein the communication quality includes a latest reception level;
wherein to determine to change the encryption key includes a plurality of determinations performed by the controller:
 a determination that the latest reception level does not exceeds a threshold of a prescribed level;
 wherein the communication quality further includes a frequency with which a reception error occurs; and
 a determination that the frequency with which the reception error occurs is lower than a prescribed frequency threshold;
wherein, in a case where the controller determines that the encryption key is to be changed, the controller performs a procedure that changes the encryption key to a different key during the call; and
wherein, in a case where the controller determines that the encryption key is not to be changed, the controller does not perform the procedure that changes the encryption key and determines again whether or not to change the encryption key after the prescribed time elapses one more time during the call.

2. A control method for a wireless communications device that is constituted from a control station and a slave station, the method comprising:

performing communication between the control station and the slave station using an encryption key;
determining whether or not to change the encryption key based on a communication quality of a call after a prescribed time elapses during the call;
wherein the communication quality includes a latest reception level; and
wherein to determine to change the encryption key includes a plurality of determinations:
 a determination that the latest reception level does not exceeds a threshold of a prescribed level;
 wherein the communication quality further includes a frequency with which a reception error occurs; and
 a determination that the frequency with which the reception error occurs is lower than a prescribed frequency threshold;
in a case where a result of the determining is that the encryption key is to be changed, performing a procedure that changes the encryption key to a different key during the call; and
in a case where the result of the determining is that the encryption key is not to be changed, not performing the procedure that changes the encryption key and determining again whether or not to change the encryption key after the prescribed time elapses one more time during the call.

\* \* \* \* \*